United States Patent [19]

Zimmermann et al.

[11] Patent Number: 4,560,172

[45] Date of Patent: Dec. 24, 1985

[54] NON-CONTACTING SEALING ARRANGEMENT FOR A ROTATING PART

[75] Inventors: Horst Zimmermann, Munich; Joachim Lorenz, Dachau, both of Fed. Rep. of Germany

[73] Assignee: MTU Motoren-und Turbinen-Union Munchen GmbH, Munich, Fed. Rep. of Germany

[21] Appl. No.: 592,248

[22] Filed: Mar. 22, 1984

[30] Foreign Application Priority Data

Mar. 26, 1983 [DE] Fed. Rep. of Germany ....... 3311121

[51] Int. Cl.⁴ .............................................. F16J 15/42
[52] U.S. Cl. ..................................... 277/3; 277/14 R; 277/25; 277/67; 277/135; 277/204
[58] Field of Search ................ 277/3, 13, 14 R, 14 V, 277/25, 53, 54, 67–69, 135, 203, 204

[56] References Cited

U.S. PATENT DOCUMENTS

| 1,487,849 | 3/1924 | Grauert | 277/14 X |
| 1,895,497 | 1/1933 | Stiefel | 277/3 |
| 1,949,428 | 3/1934 | McGee | 277/13 X |
| 2,488,200 | 11/1949 | Juhlin et al. | 277/135 X |
| 3,068,800 | 12/1962 | Mueller | 277/3 X |
| 3,068,801 | 12/1962 | Murray | 277/3 X |

Primary Examiner—Robert S. Ward
Attorney, Agent, or Firm—Craig and Burns

[57] ABSTRACT

A non-contacting seal between a rotating part to be sealed and a stationary part, in which the rotating part includes a coaxial disk which is surrounded by a stationary collecting channel axially closely adjoining the disk but without contacting it. The collecting channel forms a spirally shaped hollow space in the circumferential direction of the rotating part, with a sealing medium return line connected to the hollow space within the area of enlargement of the hollow space. A seal, however, may also be installed between the rotating part and the fixed part.

20 Claims, 4 Drawing Figures

NON-CONTACTING SEALING ARRANGEMENT FOR A ROTATING PART

The present invention relates to a non-contacting seal between a rotating part to be sealed and a stationary part.

The sealing of shafts at slight excess pressure within a housing has been solved in numerous ways, for example, by F. Wankel. However, simple and reliable seals are still not available.

It is the object of the present invention to provide a non-contacting sealing arrangement of the aforementioned type which is simple and also reliable.

The underlying problems are solved by the present invention in that the rotating part includes at least one coaxial disk with enlarged diameter, which is surrounded by a stationary collecting channel axially closely adjoining the same without contacting it, whereby the collecting channel forms in the circumferential direction of the rotating part a spirally shaped hollow space which becomes wider in the direction of rotation of the rotating part, and in that within the area of the largest dimension of the spirally shaped hollow space, a return line for the sealing medium is connected thereto. In operation, the sealing medium is centrifuged radially outwardly through the narrow gap between the disk and the collecting channel during rotation of the rotating part by reason of the interacting centrifugal force and, on the one hand, is collected in the spirally shaped hollow space and, on the other, is fed into the return line by reason of the enlargement of the hollow space. In a similar manner, air enters into the spirally shaped hollow space on the atmosphere side of the rotating part through the other narrow gap between the disk and the collecting channel so that a sealing medium blockage occurs thereat. As is quite apparent, a reliable non-contacting sealing arrangement of shafts or the like is created by the present invention with the aid of simple means by utilization of the centrifugal force.

A high pressure builds up in the spirally shaped hollow space during the operation as a result of the rotating sealing medium. In order to limit the recirculation quantity of the sealing medium, a restrictor is advantageously arranged in the sealing medium return line.

The sealing medium return line is appropriately in communication with the bearing chamber of the rotating part itself for the purpose of a return feed of the sealing medium.

A liquid, preferably oil or oil-air mixture is used as seaing medium in the present invention.

In order to also collect at low circumferential velocities dripping sealing medium, respectively, dripping oil and eventually also sweat oil and in order to centrifuge the same once more radially outwardly and feed the same from there into the return line, according to a further advantageous feature of the present invention two coaxial disks spaced from one another are provided which are surrounded by a common collecting channel in the manner of a labyrinth seal.

The circumferential rim of the disk is appropriately constructed at an acute angle in order to enable a centrifuging of the sealing medium also at low circumferential velocities of the rotating part.

Advantageously, the circumferential rim of the disk includes an enlarged axial flange-circumferential section for the purpose of forming a labyrinth seal with the collecting channel on the atmosphere side in order to further improve the blocking action of the sealing medium on the atmosphere side, especially at low circumferential velocities of the rotating part.

A non-contacting sealing arrangement which is suitable for slightly larger excess pressures, includes according to a further feature of the present invention a secondary circumferential seal on the sealing medium side of the disk in order to prevent an excessive amount of sealing medium, i.e., oil, from entering into the main seal and after being fed back, leading to a strong turbulence or vortexing in the bearing chamber. The secondary circumferential seal is appropriately a sealing ring and/or a lip seal arrangement.

For reinforcing the sealing action, a further feature of the present invention provides that at least on the sealing medium side, the disk includes ribs or blades directed radially.

A further feature of the present invention resides in that in lieu of the stationary part of the seal, a second rotating part is provided with respect to which a seal is to be established.

These and other objects, features and advantages of the present invention will become more apparent from the following description when taken in connection with the accompanying drawing which shows, for purposes of illustration only, several embodiments in accordance with the present invention, and wherein.

Figure 1:
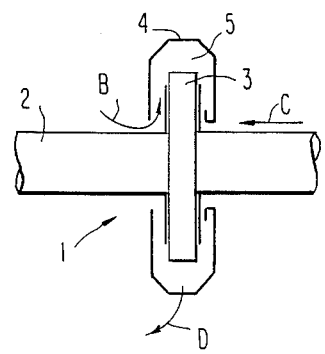
FIG. 1 is a schematic axial cross-sectional view through a non-contacting sealing arrangement according to the present invention.

Referring now to the drawing wherein like reference numerals are used throughout the various views to designate like parts and more particularly to FIG. 1, a non-contacting sealing arrangement generally designated by reference numeral 1 is illustrated in connection with a rotating part 2 in the form of a rotating shaft.

The rotating shaft 2 includes as part of the sealing arrangement an integrated collar in the form of a coaxial disk 3 which is circumferentially surrounded and enclosed by a collecting channel 4. The collecting channel 4 is preferably a sheet-metal part which is fixedly secured at the housing (not shown).

The arrangement of the collecting channel 4 is made in such a manner that on the sealing medium side of the rotating shaft (according to FIG. 1, to the left of disk 3) as well as on the atmosphere side of the shaft (according to FIG. 1, to the right of disk 3), one narrow radially extending circumferential gap each is formed between the collecting channel 4 and the disk 3. The radially outer circumferential part of the collecting channel 4 has a hollow cylindrical shape, whereby the axis of the hollow cylinder is offset with respect to the axis of the rotating shaft 2. As a result thereof, as can be seen from FIG. 2, a spirally shaped hollow space 5 results between the radially outer collecting channel section and the maximum dimension of the disk 3.

A return line 6 for the sealing medium, which is connected circumferentially to the spirally shaped hollow space 5 within the area of the largest dimension of the hollow space, leads to a bearing chamber (see FIG. 2); the bearing chamber is not shown in that it may be of standard configuration. A restrictor 7 is disposed in the return line 6 in order to limit the recirculation quantity of the sealing medium.

OPERATION

The operation of the sealing arrangement in accordance with the present invention is as follows:

Sealing medium, preferably in the form of an air-oil mixture, is sucked in on the sealing medium side of the rotating shaft 2 into the spirally shaped hollow space 5 of the collecting channel 4 through the gap on the sealing medium side of the stationary collecting channel 4 along the arrow B as a result of the rotating disk by reason of the interacting centrifugal force and, respectively, is centrifuged radially outwardly into the hollow space 5 by rotation of the disk 3. In a similar manner, air enters into the hollow space 5 on the other side (atmosphere side) through the gap existing thereat. A high pressure builds up in the spirally shaped hollow space 5 as a result of the rotating oil rotating in the direction of arrow A according to FIG. 2 so that the oil is fed back into the bearing chamber of the rotating shaft by way of the return line 6 and through the restrictor 7. The restrictor 7 takes care of a limitation of the recirculation quantity of oil. During a constant manner of operation, it is possible to so adjust the restrictor that only oil (and not air) is fed back.

Figure 2:
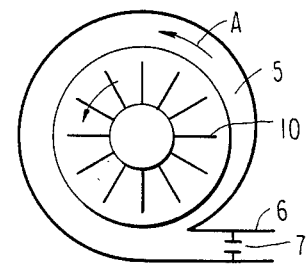
FIG. 2 is a schematic transverse cross-sectional view through the embodiment according to FIG. 1.

For reinforcing the sealing action, radially extending ribs 10 are circumferentially provided on both sides of the disk 3, as is schematically shown in FIG. 2.

Figure 3:
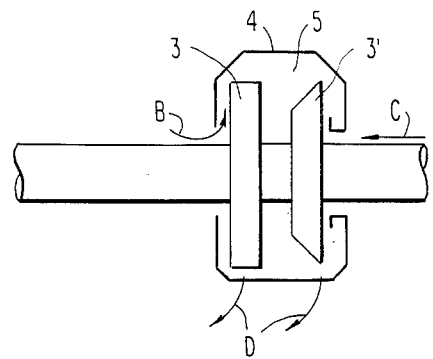
FIG. 3 is a schematic axial cross-sectional view through a modified embodiment of a sealing arrangement in accordance with the present invention with two coaxial disks.

Another embodiment of a collecting channel sealing arrangement with recirculation is illustrated in FIG. 3. In particular, two disks 3 and 3' are provided which are arranged coaxially to the rotating shaft and spaced from one another and which are secured on the rotating shaft for rotation in unison therewith. Both disks 3 and 3' are enclosed by a common collecting channel 4 in the manner of the embodiment according to FIG. 1 so that during the operation oil-air mixture enters into the spirally shaped space 5 of the collecting channel 4 on the sealing medium side along arrow B and air on the atmosphere side along the arrow C, and the oil-air mixture after rotation in the direction of arrow A is returned into the return line 6 at the location of greatest enlargement of the hollow space 5, as is schematically indicated by the arrows D in FIG. 3.

The first disk 3 on the sealing medium side of the rotating shaft is constructed as in the embodiment according to FIG. 1. The further coaxial disk 3' on the atmosphere side has a circumferential rim extending at an acute angle, by means of which dripping oil and eventually also sweat oil is once more fed radially outwardly even at low circumferential velocities of the rotating shaft. Alternatively, the disk 3 on the sealing medium side can be constructed with a circumference extending at an acute angle like the coaxial disk 3'.

Figure 4:
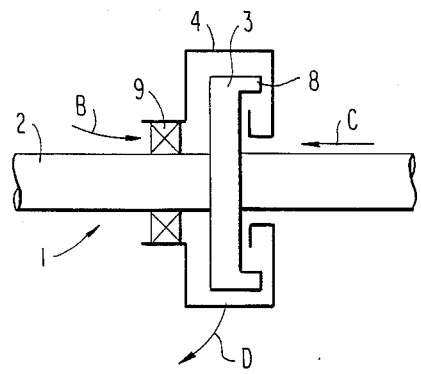
FIG. 4 is a schematic axial cross-sectional view through a further modified embodiment of a sealing arrangement in accordance with the present invention.

The embodiment illustrated in FIG. 4 includes additionally a secondary seal 9 on the rotating shaft 2 in the form of a slide ring seal which is located on the sealing medium side upstream of the coaxial disk 3. The coaxial disk 3 of the embodiment according to FIG. 4 includes a circumferential rim with an enlarged axially extending circumferentially disposed flange section 8 for the purpose of forming a labyrinth seal together with the collecting channel 4 on the atmosphere side. The sealing arrangement 1 according to FIG. 4 is suitable for somewhat larger excess pressures by reason of the secondary circumferential seal 9 so that excessive amounts of oil are prevented from entering into the main seal, i.e., the sealing arrangement 1. Accordingly, strong turbulence or eddying in the bearing chamber is thereby avoided.

While we have shown and described several embodiments in accordance with the present invention, it is understood that the same is not limited thereto but is susceptible of numerous changes and modifications as known to those skilled in the art, and we, therefore, do not wish to be limited to the details shown and described herein but intend to cover all such changes and modifications as are encompassed by the scope of the appended claims.

We claim:

1. A non-contacting sealing arrangement between a rotating part and a stationary part, comprising centrifugal disk means arranged on the rotating part, a fluid sealing medium being present between the centrifugal disk means and the stationary part, the stationary part having in the axial direction of the rotating part an atmosphere side and a sealing medium side, the stationary part being constructed as spiral housing means having a circumferential hollow space surrounding the rotating part contact-free, the hollow space becoming wider in the direction of rotation of the rotating part and being connected within the area substantially of its largest dimension to a sealing medium return line.

2. A sealing arrangement according to claim 1, wherein the rotating part includes a rotating shaft.

3. A sealing arrangement according to claim 1, wherein a restrictor is arranged in the sealing medium return line.

4. A sealing arrangement according to claim 3, wherein the sealing medium return line is operatively connected with a bearing chamber of the rotating part.

5. A sealing arrangement according to claim 4, wherein the fluid sealing mechanism is a liquid.

6. A sealing arrangement according to claim 5, wherein the liquid is oil.

7. A sealing arrangement according to claim 1, wherein two coaxial mutually spaced disk means are provided which are surrounded by a common collecting channel means of the stationary part.

8. A sealing arrangement according to claim 1, wherein the circumferential rim of one of the disk means extends at an acute angle.

9. A sealing arrangement according to claim 1, wherein the circumferential rim of the disk means includes an axially extending circumferentially disposed flange section for the purpose of forming a labyrinth seal together with the spiral housing means on the atmosphere side.

10. A sealing arrangement according to claim 1, wherein a secondary seal means is located on the sealing medium side upstream of the disk means.

11. A sealing arrangement according to claim 10, wherein the secondary seal means includes a slide ring seal.

12. A sealing arrangement according to claim 10, wherein the circumferential rim of the disk means includes an axially extending circumferentially disposed flange section for the purpose of forming a labyrinth seal together with the spiral housing means on the atmosphere side.

13. A sealing arrangement according to claim 1, wherein the disk means includes rib means at least on the sealing medium side thereof.

14. A sealing arrangement according to claim 13, wherein said rib means are in the form of a plurality of radially extending ribs.

15. A sealing arrangement according to claim 1, wherein the sealing medium return line is operatively connected with a bearing chamber of the rotating part.

16. A sealing arrangement according to claim 1, wherein the fluid sealing mechanism is a liquid.

17. A sealing arrangement according to claim 7, wherein the circumferential rim of one of the disk means extends at an acute angle.

18. A sealing arrangement according to claim 9, wherein a secondary seal means is located on the sealing medium side upstream of the disk means.

19. A sealing arrangement according to claim 18, wherein the disk means includes rib means at least on the sealing medium side thereof.

20. A sealing arrangement according to claim 7, wherein at least one of the two spaced disk means includes rib means on the sealing medium side thereof.

* * * * *